United States Patent [19]
Marchesani et al.

[11] Patent Number: 5,790,600
[45] Date of Patent: Aug. 4, 1998

[54] METHOD OF COMPENSATING DIFFERENCES IN GROUP PROPAGATION TIMES BETWEEN THE ANALOG FILTERS OF A TRANSMITTER AND BETWEEN THOSE OF A RECEIVER FOR SIGNALS IN PHASE QUADRATURE CORRESPONDING COMPENSATION APPARATUS AND A CORRESPONDING TRANSMISSION SYSTEM

[75] Inventors: Rossano Marchesani, Puteaux; Pierre Roux, Argenteuil; Jean-Francois Houplain, Saint Germain En Laye, all of France

[73] Assignee: Alcatel Italia S.P.A., Milan, Italy

[21] Appl. No.: 789,996

[22] Filed: Jan. 28, 1997

[30] Foreign Application Priority Data

Jan. 29, 1996 [EP] European Pat. Off. ............. 96830037

[51] Int. Cl.$^6$ .................................................. H04L 27/00
[52] U.S. Cl. ....................... 375/259; 375/324; 375/340; 329/304; 329/305
[58] Field of Search ........................ 375/259, 295, 375/298, 303, 308, 316, 328, 329, 330, 340, 324; 329/304, 345; 332/103, 144

[56] References Cited

U.S. PATENT DOCUMENTS

| | | |
|---|---|---|
| 4,805,189 | 2/1989 | Mahoney ................................ 375/232 |
| 5,065,107 | 11/1991 | Kumar et al. . |
| 5,075,774 | 12/1991 | Gibson et al. . |
| 5,394,439 | 2/1995 | Hemmati . |
| 5,521,548 | 5/1996 | Sugawara ............................. 329/306 |
| 5,677,932 | 10/1997 | Comte et al. ......................... 375/235 |

FOREIGN PATENT DOCUMENTS

0656713A1  6/1995  European Pat. Off. .
WO9416506  7/1994  WIPO .

OTHER PUBLICATIONS

Kuang-Tsan Wu et al., "256-QAM Modem Performance in Distorted Channels", IEEE Transactions on Communications, vol. 33, No. 5, May 1985, New York, US, pp. 487–491.

Gardner, "A BPSK/QPSK timing-error detector for sampled receivers", IEEE Transactions on Communications, vol. 34, No. 5, May 1986, New York, US pp. 423–429.

Primary Examiner—Wellington Chin
Assistant Examiner—Conguan Tran
Attorney, Agent, or Firm—Sughrue, Mion, Zinn, Macpeak & Seas, PLLC

[57] ABSTRACT

The invention relates in particular to a method of compensating differences in group propagation times between first and second analog filters of a transmitter of signals in phase quadrature, and between third and fourth analog filters of a receiver of signals in phase quadrature. The method consists in: applying the output signals from the first and second filters respectively to the third and fourth analog filters so as to measure a time difference $\Delta 1$ equal to: $[Tx+Rx]-[Ty+Ry]$ where Tx, Rx, Ty, and Ry are respective propagation times for the signals through the first, second, third, and fourth filters; applying the output signals from the first and second filters respectively to the fourth and third analog filters so as to measure a time difference $\Delta 2$ equal to: $[Ty+Rx]-[Tx+Ry]$ and determining weighting coefficients from the differences $\Delta 1$ and $\Delta 2$ for application to digital filters in series with said analog filters so as to compensate the group propagation time differences respectively between the first and second analog filters and between the third and fourth analog filters.

7 Claims, 4 Drawing Sheets

5,790,600

1

METHOD OF COMPENSATING DIFFERENCES IN GROUP PROPAGATION TIMES BETWEEN THE ANALOG FILTERS OF A TRANSMITTER AND BETWEEN THOSE OF A RECEIVER FOR SIGNALS IN PHASE QUADRATURE CORRESPONDING COMPENSATION APPARATUS AND A CORRESPONDING TRANSMISSION SYSTEM

The present invention relates generally to transmitting signals in phase quadrature, and more particularly to a method of compensating differences in group propagation times between the analog filters of a transmitter of signals in phase quadrature and between the analog filters of a receiver of signals in phase quadrature.

BACKGROUND OF THE INVENTION

For the following types of quadrature signal transmission: M-PSK (M-state phase shift keying), M-APSK (M-state amplitude and phase shift keying), etc. it is common to use a transmitter and a receiver of signals modulated in phase quadrature as shown in FIGS. 1A and 1B.

The transmitter shown in FIG. 1A includes an interface 1 which, on the basis of the signal to be transmitted S, delivers two digital signals in baseband to respective processing paths 2', 2". Each processing path includes a generally programmable digital filter 3', 3" the output of which is connected to a digital-to-analog converter 4', 4". The output of each digital-to-analog converter 4', 4" is connected to a respective analog transmission filter 5', 5" of the low-pass type. The signals delivered by the processing paths 2', 2" are applied to a phase quadrature modulator 6 where they are mixed respectively with a signal cos ωt and a signal sin ωt (where ω=2πf and f is the frequency of the carrier of the transmitted signal), and are then summed.

The output signal ST from the modulator 6 is conveyed by a transmission channel, e.g. a radio channel, for the attention of a receiver shown in FIG. 1B.

The receiver includes a phase quadrature demodulator 8 mixing the received signal SR with a signal cos ωt and a signal sin ωt to obtain two baseband signals applied to respective processing paths 9', 9". Each processing path includes an analog reception filter 10', 10" of the low-pass type whose output is connected to an analog-to-digital converter 11', 11" to which a generally programmable and optionally self-adaptive digital filter 12', 12" is connected. When said digital filters 12", 12" are self-adaptive filters, each of them is controlled by corresponding estimation means (not shown). The signals obtained at the outputs of the paths 9' and 9" are applied to a processing unit 13 delivering an output signal S. The signals delivered by the analog-to-digital converters 11' and 11" are also applied to the inputs of a clock recovery circuit 14 whose output signal controls the sampling instants of the analog-to-digital converters 11' and 11".

The problem is that because of the tolerances of the components constituting firstly the analog filters 5' & 5" and secondly the analog filters 10' & 10", said filters are not absolutely identical in pairs (the filter 5' is different from the filter 5", and the filter 10' is different from the filter 10"). As a result, the group propagation times differ firstly through the processing paths 2' & 2" and secondly through the processing paths 9' & 9". Such differences result in an error on the closure of the eye diagram at the samplers that are part of the analog-to-digital converters 11' and 11".

2

A prior art solution for remedying that problem is to use filters 5' & 5" and 10' & 10" that are respectively matched, which requires either components that have very tight tolerances, or else accurate adjustment of the filters 5', 5", 10', 10". Unfortunately tight-tolerance components are expensive, and accurate adjustment is time-consuming.

Another prior art solution is to compensate the difference with equalizers at the reception end. An equalizer is constituted by an adaptive filter and by estimation means calculating the coefficients of the adaptive filter. In which case, the digital filters 12' and 12" can be used and estimation means can be added. However, it is then necessary to add estimation means to each receiver to control the digital filters and to provide group propagation times that are identical through both paths of each receiver.

OBJECTS AND SUMMARY OF THE INVENTION

A particular object of the invention is to remedy those drawbacks.

More precisely, an object of the invention is to provide a method of compensating differences in group propagation times between the analog filters of a transmitter and between those of a receiver for signals in phase quadrature, which method does not require costly additional components, manual adjustments, or estimators added to each receiver.

To this end, the present invention provides a method of compensating differences in group propagation times between the analog filters of a transmitter of signals in phase quadrature, and between the analog filters of a receiver of signals in phase quadrature, the transmitter including a phase quadrature signal modulator delivering a transmission signal on the basis of first and second baseband signals from first and second processing paths, the first and second processing paths including respective first and second analog transmission filters, the receiver including a phase quadrature signal demodulator which, on the basis of the received signal, delivers third and fourth baseband signals to respective third and fourth processing paths, the third and fourth processing paths respectively including third and fourth analog reception filters respectively delivering a third filtered signal X and a fourth filtered signal Y, the receiver further including a clock recovery circuit delivering a clock signal on the basis of the third and fourth filtered signals, respectively X and Y;

the method consisting in:

a) applying the first and second signals respectively to the third and fourth analog filters, the signals output by the third and fourth analog filters constituting respective signals X1 and Y1 which are applied to means for estimating time difference and delivering a difference:

$$\Delta 1 = [Tx + Rx] - [Ty + Ry]$$

where Tx, Rx, Ty, and Ry are respective propagation times for the signals through the first, second, third, and fourth filters, the difference Δ1 being representative of the time difference between optimum sampling instants between the signals X1 and Y1;

(b) applying the first and second signals respectively to the fourth and third analog filters, the signals output by the third and fourth analog filters constituting respective signals X2 and Y2 which are applied to the means for estimating time difference which deliver a difference:

$$\Delta 2 = [Ty + Rx] - [Tx + Ry]$$

the difference Δ2 being representative of the time difference between the optimum sampling instants between the signals X2 and Y2; and c) determining weighting coefficients from the differences Δ1 and Δ2 for application to fifth, sixth, seventh, and eighth digital filters inserted in the first, second, third, and fourth processing paths, the filters being inoperative during the steps a) and b), thereby compensating the group propagation time differences firstly between the first and second analog filters and secondly between the third and fourth analog filters.

The present invention thus makes it possible to use analog filters comprising components that have slack tolerances because the differences in group propagation times between the analog filters of the transmitter and between the analog filters of the receiver are automatically compensated by the digital filters.

By calculating the weighting coefficients applied to the digital filters on the basis of the time differences Δ1 and Δ2, it is possible to adjust the paths so as to compensate their differential delay, in a manner comparable to the compensation procured by an equalizer. But, unlike a solution using genuine equalizers, the solution of the present invention needs neither estimation means for continuously calculating the coefficients of adaptive filters, nor additional analog-to-digital converters for converting the output signals from the analog filters of the transmitter.

Advantageously, the symbol rate of the first and second signals is the highest symbol rate that can be accepted by a transmission system including said transmitter and said receiver.

The invention also provides apparatus for estimating the differences Δ1 and Δ2, the apparatus consisting in:

first and second Gardner type circuits respectively receiving the third and fourth filtered signals X and Y, the Gardner type circuits also serving as a clock recovery circuit;

a subtracter subtracting the signal provided by the second Gardner type circuit from the signal provided by the first Gardner type circuit; and an integrator integrating the signal provided by said subtracter to produce said differences Δ1 and Δ2.

Advantageously, each of the Gardner type circuits comprises a first delay circuit receiving an input signal, the output from the first delay circuit being connected to the input of a second delay circuit, a subtracter subtracting the signal input into the first delay circuit from the signal provided by the second delay circuit, and a multiplier multiplying the signal provided by the first delay circuit by the signal provided by the subtracter.

The subtracter and the integrator of the circuit for estimating the differences Δ1 and Δ2 may be integrated in said receiver, since they are very cheap.

BRIEF DESCRIPTION OF THE DRAWINGS

Other characteristics and advantages of the present invention appear more clearly on reading the following description given with reference to the corresponding accompanying drawings, in which.

In all of the figures, identical elements are given the same reference numbers.

MORE DETAILED DESCRIPTION

FIG. 1 is described above with reference to the state of the art.

Figure 2:
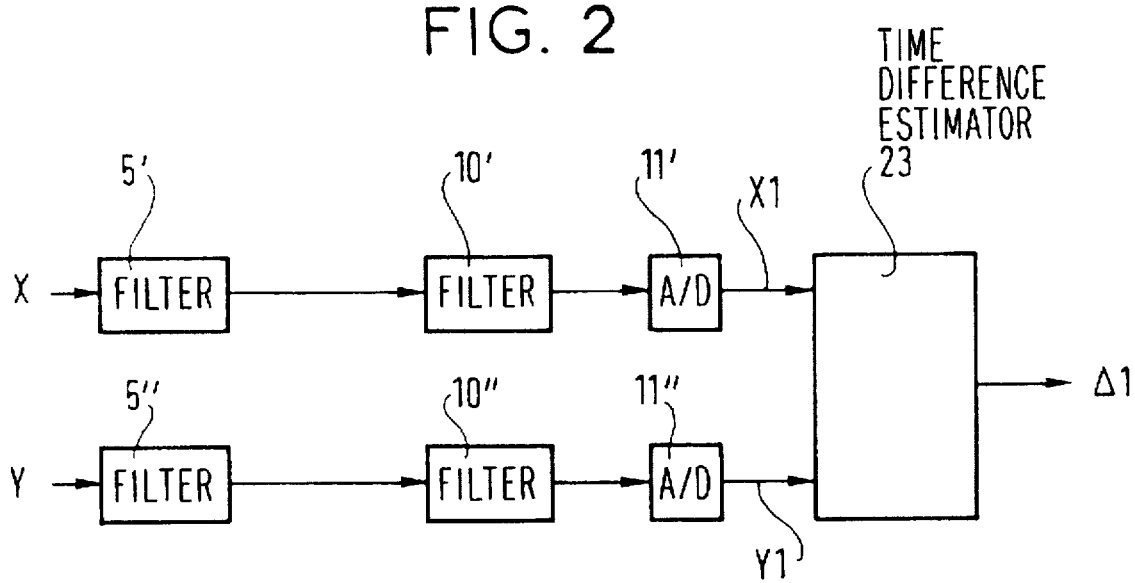
FIG. 2 shows a step a) of the method of the present invention.

FIG. 2 shows the configuration for a step a) of the method of the present invention, in which configuration the analog filter 5' is connected to the analog filter 10' and the analog filter 5" is connected to the analog filter 10". Known signals are applied to the input of the analog filter 5' and to the input of the analog filter 5". The signals delivered by the analog filters 10' and 10" are applied to the inputs of the analog-to-digital converters 11' and 11" which deliver signals X1 and Y1. The signals X1 and Y1 are offset relative to each other by a time difference Δ1 equal to:

$$\Delta 1 = (Tx + Rx) - (Ty + Ry)$$

where Tx, Rx, Ty, and Ry are respective propagation times for the signals through the filters 5', 5", 10', and 10". The signals X1 and Y1 are applied to the inputs of a time difference estimator 14, 23 which delivers the difference Δ1. The time difference estimator 23 re-uses most of the clock recovery circuit 14 and is described below. The difference Δ1 is representative of the time difference between optimum sampling instants of said signals X1 and Y1.

Figure 3:
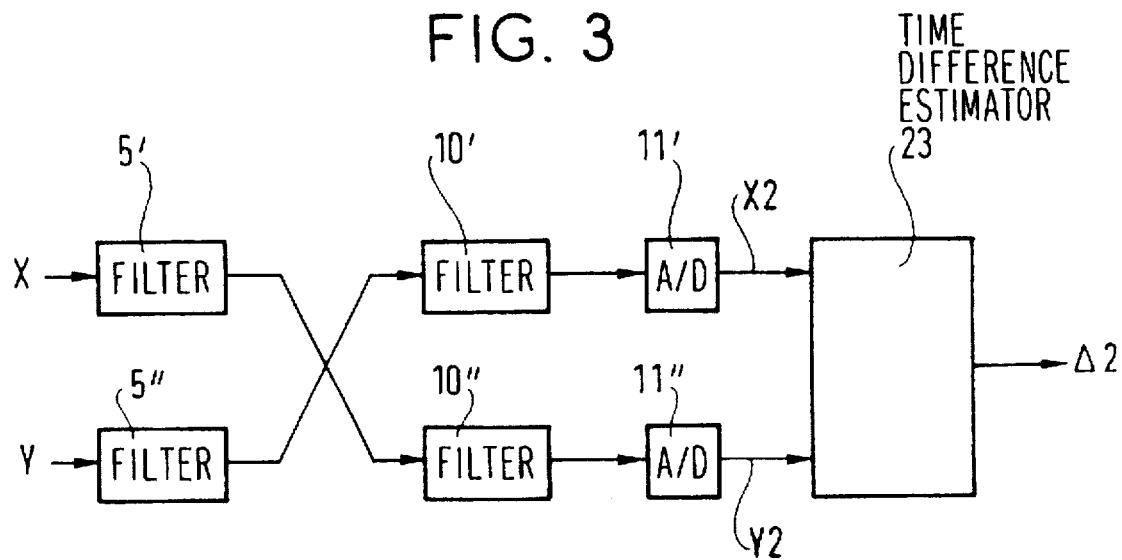
FIG. 3 shows a step b) of the method of the present invention.

FIG. 3 shows the configuration for a step b) of the method of the present invention, in which the analog filter 5' is connected to the analog filter 10", and the analog filter 5" is connected to the analog filter 10'. Known signals are applied to the inputs of the analog filters 5' and 5". The signals delivered by the analog filters 10' and 10" are applied to the inputs of the analog-to-digital converters 11' and 11" which deliver signals X2 and Y2. The signals X2 and Y2 are offset relative to each other by a time difference Δ2 equal to:

$$\Delta 2 = (Ty + Rx) - (Tx + Ry)$$

where Tx, Rx, Ty, and Ry are as defined with reference to FIG. 2. The signals X2 and Y2 are applied to the inputs of the time difference estimator 14, 23 which delivers the difference Δ2. The difference Δ2 is representative of the time difference between optimum sampling instants of said signals X2 and Y2.

Δ1 and Δ2 are measured by connecting the analog filters together directly (physically).

The differences in group propagation times between the analog filters 5' and 5" of the transmitter can be calculated on the basis of Δ1 and Δ2 in the following manner:

$$Tx - Ty = \frac{1}{2}(\Delta 1 - \Delta 2)$$

Similarly, the differences in group propagation times between the analog filters of the receiver 10' and 10" can be calculated on the basis of Δ1 and Δ2 in the following manner:

$$Rx - Ry = \frac{1}{2}(\Delta 1 + \Delta 2)$$

The method then consists in calculating the coefficients of the digital filters 3', 3" so as to compensate said difference in propagation times, on the basis of the difference in propagation times between the analog filters 5' and 5". Similarly, the difference in propagation times between the analog filters of the receiver 10', 10" is used to obtain the coefficients of the digital filters 12', 12" so as to compensate said difference in propagation times. The digital filters 3', 3", 12', 12" are described below.

The digital filters 3', 3", 12' and 12" have no influence on the value of the differential delay during estimation of the difference in propagation times (steps a) and b)). It is possible to render these filters inoperative by applying the same coefficients to the filters 3' and 3", and by applying the same coefficients to the filters 12' and 12". They are thus rendered inoperative with respect to the value of the differential delay.

Figure 4:
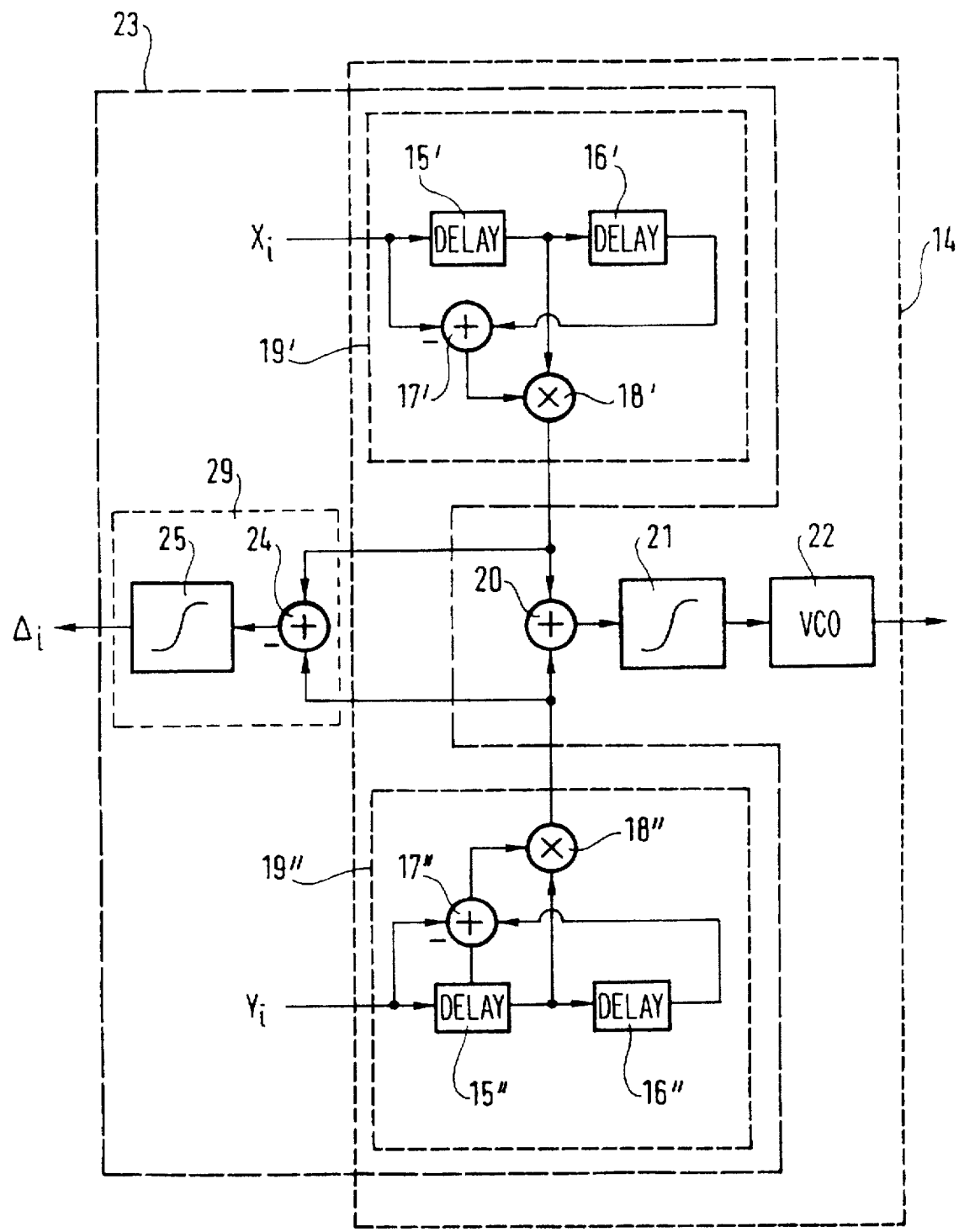
FIG. 4 shows a clock recovery circuit to which an estimation circuit of the invention is added for estimating difference in group propagation times.

FIG. 4 shows time difference estimation apparatus 23 of the present invention, which apparatus is constructed around a clock recovery circuit 14 that is part of a receiver of signals in phase quadrature.

The clock recovery circuit 14 receives the filtered and digitized signals from the baseband signal processing paths 9', 9" of the receiver, in particular the signals Xi, Yi (where i is equal to 1 or 2 depending on whether the FIG. 2 configuration or the FIG. 3 configuration is implemented) delivered by the analog-to-digital converters 11' and 11". The clock recovery circuit 14 includes a Gardner-type circuit 19', 19" for each of the signals Xi and Yi.

Reference may be made to the article entitled "A BPSK/QPSK timing-error detector for sampled receivers" by Floyd M. Gardner, IEEE Transactions On Communications, vol. COM-34, No. 5, May 1986, pages 423 to 429.

For example, a Gardner-type circuit may consist in a first delay circuit 15' or 15" receiving the signal Xi or Yi, the output of the first delay circuit being connected to the input of a second delay circuit 16' or 16". A subtracter 17' or 17" subtracts the signal input into the first delay circuit 15' (15") from the signal output by the second delay circuit 16' (16"). The delay provided by each of the delay circuits 15', 15", 16', and 16" has a value of ½Ts, where Ts is the symbol period. A multiplier 18' (18") multiplies the signal output by the first delay circuit 16' (16") by the signal delivered by the subtracter 17' (17"). The signals delivered by the multipliers 18' and 18" constitute the output signals from the Gardner-type circuits 19' and 19" respectively.

The output signal from the Gardner-type circuit 19' is added to the output signal from the Gardner-type circuit 19" in an adder 20. The sum is integrated by an integrator 21 which delivers a control signal for a voltage-controlled oscillator 22 generating the rate recovery clock signal for the analog-to-digital converters.

The difference estimation apparatus 23 of the present invention uses both "Gardner" circuits of the clock recovery circuit 14 and further includes a module 29 comprising a subtracter 24 and an integrator 25. The subtracter 24 subtracts the signal output by the "Gardner" circuit 19' from the signal output by the "Gardner" circuit 19". This difference is integrated by the integrator 25 which outputs the time difference estimation signal Δ1 or Δ2, depending on the configuration (FIG. 2 or FIG. 3).

The method of the present invention is applied prior to bringing into operation a system including the analog filters 5', 5", 10', and 10", in particular while the cards including the analog filters 5', 5", 10', and 10" are being tested. The paths are crossed over for step b) between the mixers of the quadrature phase demodulator 8 and the analog filters 10' and 10". Physical links are therefore implemented.

The subtracter 24 and the integrator 25 of the difference estimation circuit 23 that are not part of the clock recovery circuit 14 may be physically present in the receiver, i.e. incorporated in the receiver, or alternatively, they may be connectable thereto.

The method of the present invention may be used for transmission systems offering different data-rates. In which case, optimum compensation of the differences in group propagation times is achieved when the steps of the above-described method are performed at the highest symbol rate, i.e. where the differences in group propagation times constitute the most serious problem.

Figure 1A:
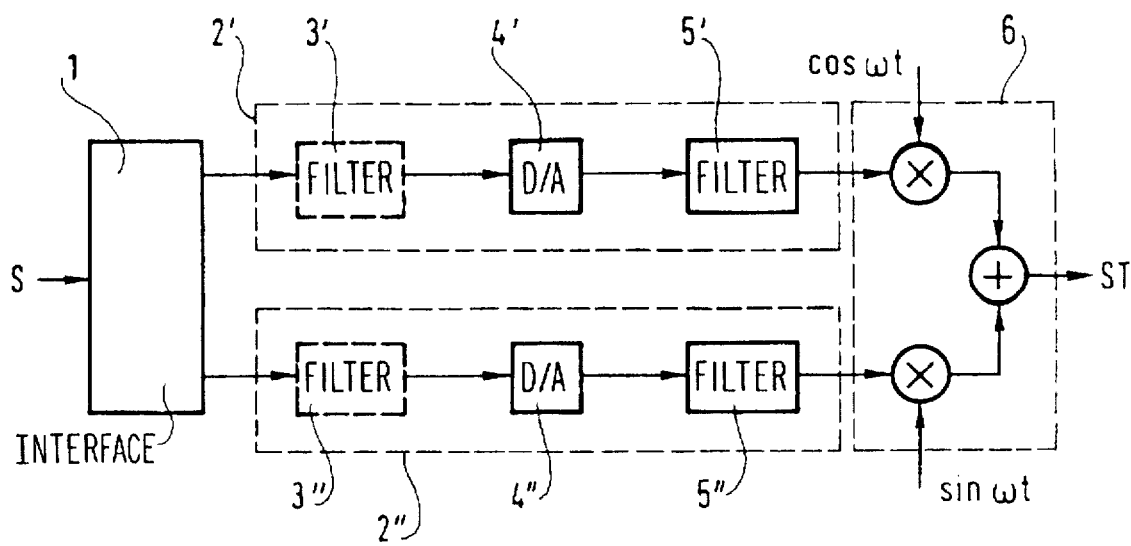
FIG. 1 shows a transmission system for signals in phase quadrature.
Figure 1B:
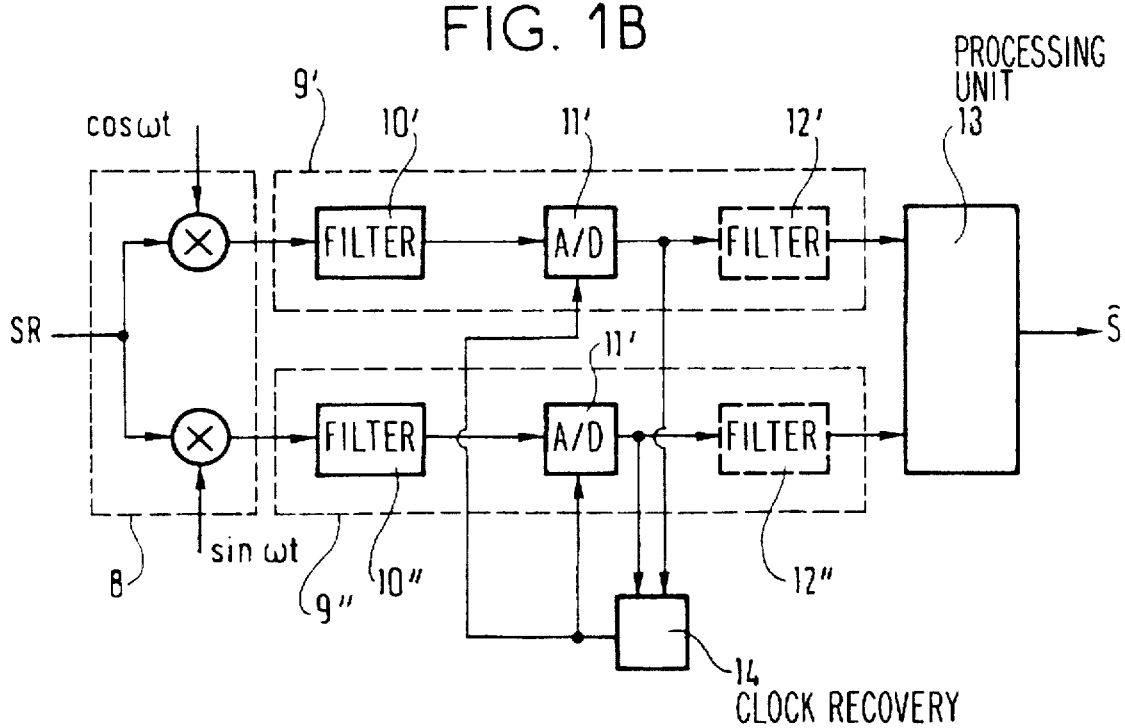

A transmission system of the invention for transmitting signals in phase quadrature is identical to that shown in FIGS. 1A and 1B, with the filters 3', 3", 12', and 12" being constituted by non-adaptive filters. For example, they may have Nyquist square root characteristics and they are preferably finite impulse response (FIR) filters.

Figure 5:
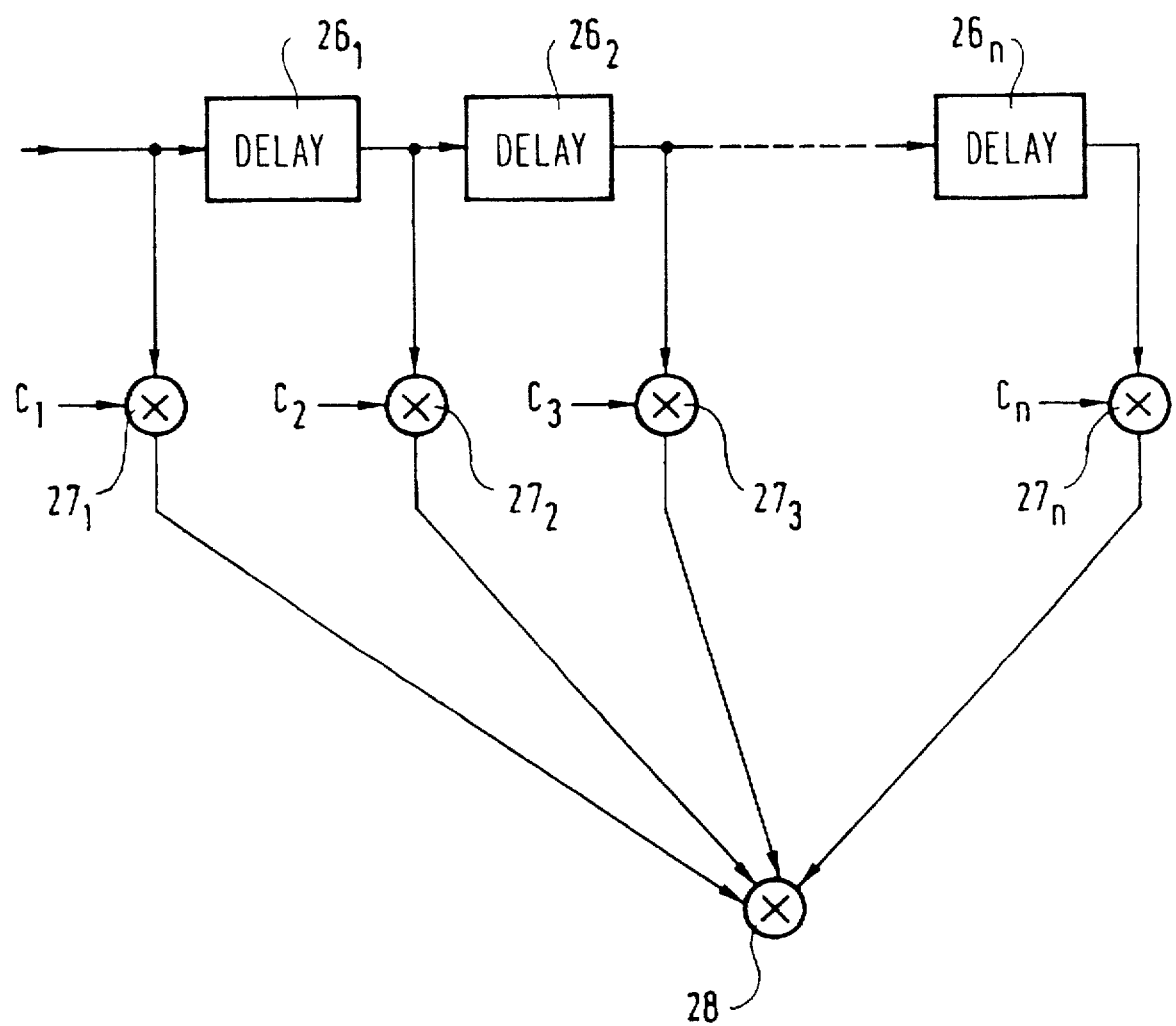
FIG. 5 shows a finite impulse response filter.

FIG. 5 shows such a finite impulse response filter. It consists in a plurality of cascaded delay circuits $26_1, 26_2, \ldots, 26_n$. Each of the signals delivered by the delay circuits is multiplied by a coefficient $c_1, c_2, \ldots, c_n$ by multipliers $27_1, 27_2, \ldots, 27_n$, and the products of the multiplications are summed in an adder 28 delivering the filtered digital output signal. The coefficients $c_1, c_2, \ldots, c_n$ of one of the digital filters 3' (or 12') differ from those of the other filter 3" (or 12") in such manner that the differences in group propagation times are compensated.

Various techniques for adjusting digital filters may be implemented. For example, for each transmitter and each receiver to be adjusted, it is possible to calculate the coefficients $c_i$ by means of a microprocessor receiving the differences Δ1 and Δ2. The microprocessor calculates the values Tx–Ty and Rx–Ry. Assuming firstly that it is the digital filters of the transmitter that are corrected, the time difference Tx–Ty referred to as ΔT is divided by Ts which is the symbol time. The result of this division is a magnitude whose value controls modification of the coefficients of the digital filter.

By way of example, for a time ΔT equal to 250 ns, and for Ts equal to 1 µs, ΔT/Ts is equal to 0.25. If the coefficients of the digital filters 3' and 3" are calculated for times (before correction) $t_{-3}, t_{-2}, t_{-1}, t_0, t_{+1}, t_{+2},$ and $t_{+3}$ (filters having seven coefficients), one of the filters keeps these coefficients, the other filter receiving coefficients calculated for the times $t_{-3.25}, t_{-2.25}, t_{-1.25}, t_{-0.25}, t_{+0.75}, t_{+1.75},$ and $t_{+2.75}$. It is also possible to correct the coefficients of the two digital filters, e.g. by correcting the coefficients of one of the filters by +ΔT/2Ts, and the coefficients of the other of the filters by −ΔT/2Ts.

It is thus essential for the coefficients of one of the filters to differ, after correction, from coefficients of the other filter as calculated at a time difference ΔT/Ts.

The same reasoning then applies to the digital filters 12' and 12" of the receiver by taking into account a difference Rx–Rt referred to as ΔY.

Another adjustment solution is to constitute in a memory a bank of a plurality of standard coefficients $ct_i$ corresponding to a plurality of predetermined differences $\Delta 1_i$ and $\Delta 2_i$. As a function of the measurements Δ1 and Δ2 taken on a set comprising one transmitter and one receiver, the coefficients $ct_i$ corresponding to the differences $\Delta 1_i$ and $\Delta 2_i$ the closest to Δ1 and Δ2 as measured are applied to the filters 3', 3", 12', and 12". The number of standard coefficients $ct_i$ is, for example, equal to 20.

The digital filters used in the invention are, for example, Nyquist square root filters whose impulse responses at the instants chosen by the sampler take values given by the following equation:

$$h(t) = 4\beta \frac{\cos\{(1+\beta)\pi t/Ts\} + \sin\{(1-\beta)\pi t/Ts\}(4\beta t/Ts)^{-1}}{(\pi Ts^{1/2})\{(4\beta t/Ts)^2 - 1\}}$$

where β is the value of the desired roll-off factor, and t designates the values of the instants at which the impulse response is to be sampled.

We claim:

1. A method of compensating differences in group propagation times between the analog filters of a transmitter of signals in phase quadrature, and between the analog filters of a receiver of signals in phase quadrature;

said transmitter including a phase quadrature signal modulator delivering a transmission signal on the basis of first and second baseband signals from first and second processing paths, said first and second processing paths including respective first and second analog transmission filters;

said receiver including a phase quadrature signal demodulator which, on the basis of the received signal, delivers third and fourth baseband signals to respective third and fourth processing paths, said third and fourth processing paths respectively including third and fourth analog reception filters respectively delivering a third filtered signal X and a fourth filtered signal Y;

said receiver further including a clock recovery circuit delivering a clock signal on the basis of said third and fourth filtered signals, respectively X and Y;

the method consisting in:

a) applying said first and second signals respectively to said third and fourth analog filters, the signals output by said third and fourth analog filters constituting respective signals X1 and Y1 which are applied to means for estimating time difference and delivering a difference:

$$\Delta 1 = [Tx + Rx] - [Ty + Ry]$$

where Tx, Rx, Ty, and Ry are respective propagation times for the signals through said first, second, third, and fourth filters, said difference Δ1 being representative of the time difference between optimum sampling instants between said signals X1 and Y1;

b) applying said first and second signals respectively to said fourth and third analog filters, the signals output by said third and fourth analog filters constituting respective signals X2 and Y2 which are applied to said means for estimating time difference which deliver a difference:

$$\Delta 2 = [Ty + Rx] - [Tx + Ry]$$

said difference Δ2 being representative of the time difference between the optimum sampling instants between said signals X2 and Y2; and c) determining weighting coefficients from said differences Δ1 and Δ2 for application to fifth, sixth, seventh, and eighth digital filters inserted in said first, second, third, and fourth processing paths, said filters being inoperative during said steps a) and b), thereby compensating said group propagation time differences firstly between said first and second analog filters and secondly between said third and fourth analog filters.

2. A method according to claim 1, wherein the symbol rate of said first and second signals is the highest symbol rate that can be accepted by a transmission system including said transmitter and said receiver.

3. Apparatus for estimating the differences Δ1 and Δ2 according to claim 1, consisting in:

first and second Gardner type circuits respectively receiving said third and fourth filtered signals X and Y, said Gardner type circuits also serving as a clock recovery circuit;

a subtracter subtracting the signal provided by the second Gardner type circuit from the signal provided by the first Gardner type circuit; and an integrator integrating the signal provided by said subtracter to produce said differences Δ1 and Δ2.

4. Apparatus according to claim 3, wherein each of said Gardner type circuits comprises a first delay circuit receiving an input signal, the output from said first delay circuit being connected to the input of a second delay circuit, a subtracter subtracting the signal input into said first delay circuit from the signal provided by said second delay circuit, and a multiplier multiplying the signal provided by said first delay circuit by the signal provided by said subtracter.

5. Apparatus according to claim 4, wherein the delay of said delay circuits is of duration Ts/2, where Ts is the symbol time.

6. Apparatus according to claim 3, wherein said subtracter and said integrator of said circuit for estimating said differences Δ1 and Δ2 are integrated in said receiver.

7. A system for transmitting signals in quadrature and including said fifth, sixth, seventh, and eighth digital filters inserted in said first, second, third, and fourth paths and compensating the group propagation time differences between said analog filters of said transmitter of signals in phase quadrature and between the analog filters of said receiver of signals in phase quadrature, according to claim 1, wherein said digital filters are finite impulse response filters.

* * * * *